(12) United States Patent
Kuo

(10) Patent No.: US 6,961,976 B2
(45) Date of Patent: Nov. 8, 2005

(54) MECHANISM FOR LIMITING CASTERS TO MOVE FORWARDLY WHILE TOWING LUGGAGE OBLIQUELY

(75) Inventor: Chung-Hsien Kuo, Pan-Chiao (TW)

(73) Assignee: Chaw Kong Technology Co., Ltd., Taipei (TW)

( * ) Notice: Subject to any disclaimer, the term of this patent is extended or adjusted under 35 U.S.C. 154(b) by 0 days.

(21) Appl. No.: 10/786,045

(22) Filed: Feb. 26, 2004

(65) Prior Publication Data

US 2004/0163208 A1     Aug. 26, 2004

(30) Foreign Application Priority Data

Feb. 26, 2003 (CN) .............................. 03204647 U

(51) Int. Cl.[7] .............................................. B60B 33/02
(52) U.S. Cl. ...................... 16/36 R; 16/35 R; 16/18 R; 280/37; 280/79.11; 280/47.11; 188/1.12
(58) Field of Search .............................. 16/35 R, 18 R; 280/33.99 C, 79.11, 37, 647, 47.38

(56) References Cited

U.S. PATENT DOCUMENTS

| | | | | |
|---|---|---|---|---|
| 1,671,774 A | * | 5/1928 | McIntosh ..................... | 16/35 R |
| 3,636,586 A | * | 1/1972 | Bollinger et al. ........... | 16/35 R |
| 3,751,758 A | * | 8/1973 | Higbee et al. ............... | 16/35 R |
| 4,037,291 A | * | 7/1977 | Huempfner et al. ......... | 16/35 R |
| 4,524,482 A | * | 6/1985 | Mueller ......................... | 16/44 |
| 4,684,148 A | * | 8/1987 | Glaser ........................ | 280/647 |
| 5,040,265 A | * | 8/1991 | France et al. ............... | 16/35 R |
| 5,263,226 A | * | 11/1993 | Roy et al. .................... | 16/35 R |
| 5,517,718 A | * | 5/1996 | Eichhorn .................... | 16/35 R |
| 6,212,733 B1 | * | 4/2001 | Yeh ............................. | 16/35 R |
| 6,382,736 B1 | * | 5/2002 | Chang .................... | 301/111.05 |
| 6,478,316 B1 | * | 11/2002 | Wagner ....................... | 280/37 |
| 6,769,701 B1 | * | 8/2004 | Clausen ....................... | 280/37 |

* cited by examiner

Primary Examiner—Brian E. Glessner
Assistant Examiner—Mark Williams
(74) Attorney, Agent, or Firm—Troxell Law Office, PLLC

(57) ABSTRACT

A caster assembly mounted at either bottom corner of luggage comprises a cavity disposed in an underside of the bottom corner, the cavity including an upright front wall and a slanted rear wall, a wheel mount including a positioning slot in a rear of an upper portion and a caster, and pendulum member including a thinner upper section pivotably secured to the cavity and a thicker lower section. The pendulum member is upright and disengaged from the positioning slot when the luggage is upright. Further, towing the luggage forwardly, obliquely will cause a portion the lower section of the pendulum member to enter in the positioning slot by pivoting due to gravity so as to limit the caster to move forwardly.

5 Claims, 5 Drawing Sheets

US 6,961,976 B2

MECHANISM FOR LIMITING CASTERS TO MOVE FORWARDLY WHILE TOWING LUGGAGE OBLIQUELY

BACKGROUND OF THE INVENTION

1. Field of the Invention

The present invention relates to luggage wheels and more particularly to a mechanism for limiting two casters of luggage to move forwardly while towing luggage forwardly, obliquely.

2. Description of Related Art

A conventional luggage may have two, three, or four wheels in which two of them are casters. Also, such casters are conventionally disposed in the rear under the wheel mount. For luggage having two front legs and two rear wheels provided under the bracket, such wheels are typically fixed (i.e., limited to move either forwardly or backward). For fixed wheels, they can be towed smoothly along a flat surface but not a winding road or uneven surface. This is because the fixed wheels cannot turn horizontally. At this state, a user has to exert much force in maneuvering the handle while towing luggage. For luggage having three or four wheels including two casters, it is advantageously of being highly maneuverable due to the horizontal turning capability of casters. However, casters suffered from a disadvantage. For example, in a case of wheeling luggage obliquely, the rear casters may be subject to turning uncontrollably, resulting in a course deflection or causing wheel damage. Thus, the need for improvements of both fixed wheels and casters of luggage still exists.

SUMMARY OF THE INVENTION

It is an object of the present invention to provide a luggage having three or four wheels wherein two of them are casters which are capable of either turning horizontally while all wheels are towing along a supporting surface or are limited to move forwardly while towing luggage forwardly, obliquely (i.e., two fixed wheels are lift above the surface). By utilizing the present invention, a highly maneuverable luggage can be carried out while towing.

To achieve the above and other objects, the present invention provides a caster assembly mounted at either bottom corner of luggage, comprising a cavity disposed in an underside of the bottom corner, the cavity including an upright front wall and a slanted rear wall; a wheel mount including a positioning slot in a rear of an upper portion, a vertical, central hole through the upper portion, and a lower caster; a bearing between the upper portion of the wheel mount and the bottom corner of luggage, the bearing including a central hole; pendulum member including a thinner upper section pivotably secured to the cavity, and a thicker lower section, the pendulum member being upright and disengaged from the positioning slot by a predetermined distance when the luggage is upright; and fastening means for securing both the wheel mount and the bearing to the bottom corner by inserting through the hole of the wheel mount and the hole of the bearing into the bottom corner, whereby towing the luggage forwardly, obliquely will cause a portion the lower section of the pendulum member to enter in the positioning slot by pivoting due to gravity so as to limit the caster to move toward a forward direction.

The above and other objects, features and advantages of the present invention will become apparent from the following detailed description taken with the accompanying drawings.

DETAILED DESCRIPTION OF THE PREFERRED EMBODIMENTS

Figure 1:
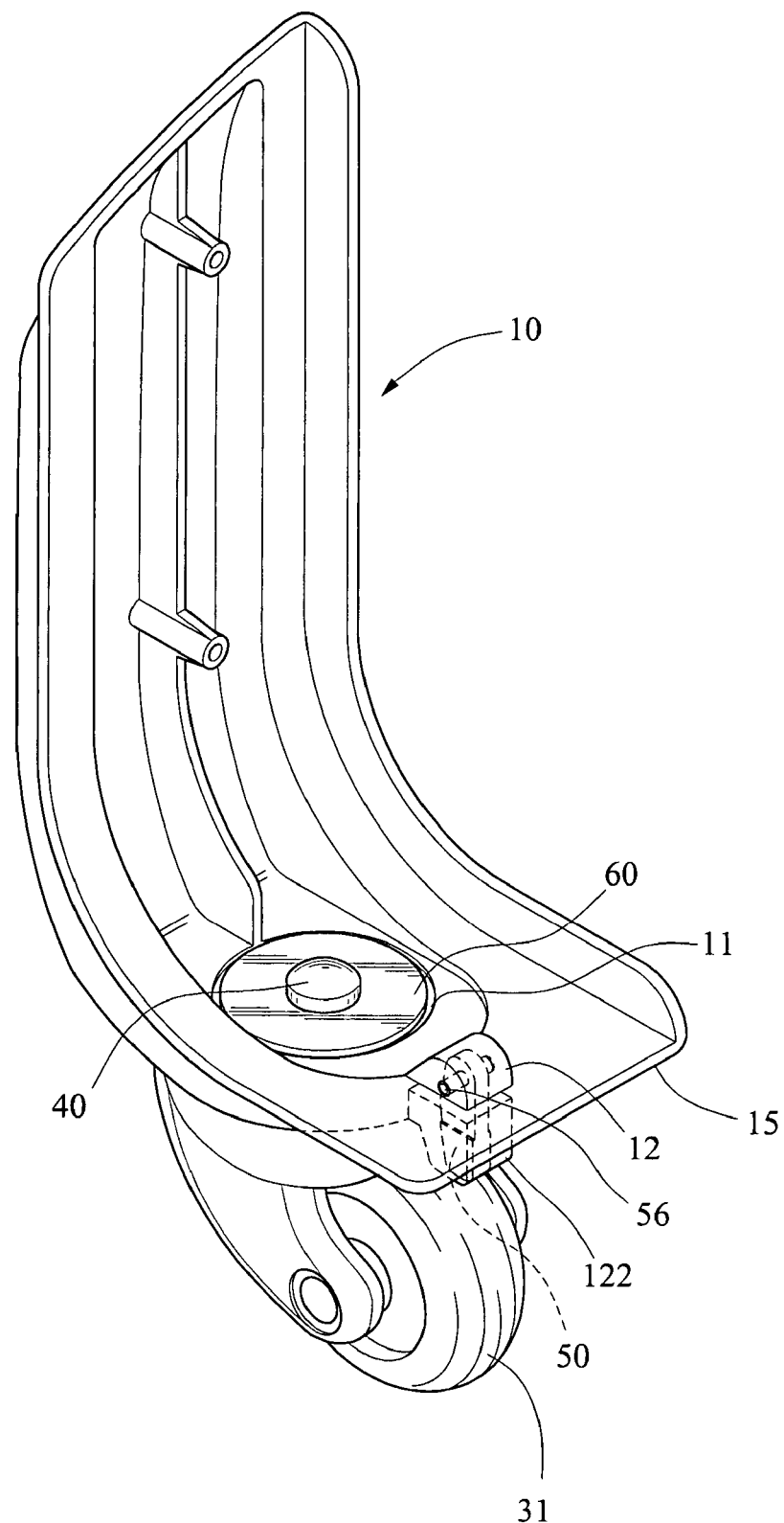
FIG. 1 is a perspective view of a caster assembly mounted under the bracket of a luggage according to the invention.

Referring to FIGS. 1 to 6, a caster assembly of luggage constructed in accordance with the invention is shown. The caster assembly comprises a support section (e.g., bracket 10 at a corner of luggage (in the embodiment shown in FIGS. 1 to 4) or a bottom plate 10A of luggage (in the embodiment shown in FIG. 5), a rotation section (e.g., wheel mount 30), a bearing section (e.g., bearing 20) interconnected the support and the rotation sections, and an alignment section (e.g., pendulum member 50) for maintaining the casters 31 and the luggage at the same movement direction (e.g., forward direction) while towing luggage obliquely as detailed later. A fastener (e.g., rivet 40) is inserted through a vertical, central hole 342 of the wheel mount 30 and a central hole of bearing 20 for securing to a hole 61 of a washer 60 on an aperture 111 of an upper recess 11 of the bracket 10. As such, a caster 31 of the wheel mount 30 can turn horizontally. Alternatively, the rivet 40 can be an integral part (e.g., shaft (not shown)) of the wheel mount 30. The shaft is inserted through the hole of bearing 20 for securing to a C-ring (not shown) on the aperture 111 of the upper recess 11. In other words, the rivet 40 is not necessary to be an independent element.

Figure 2:
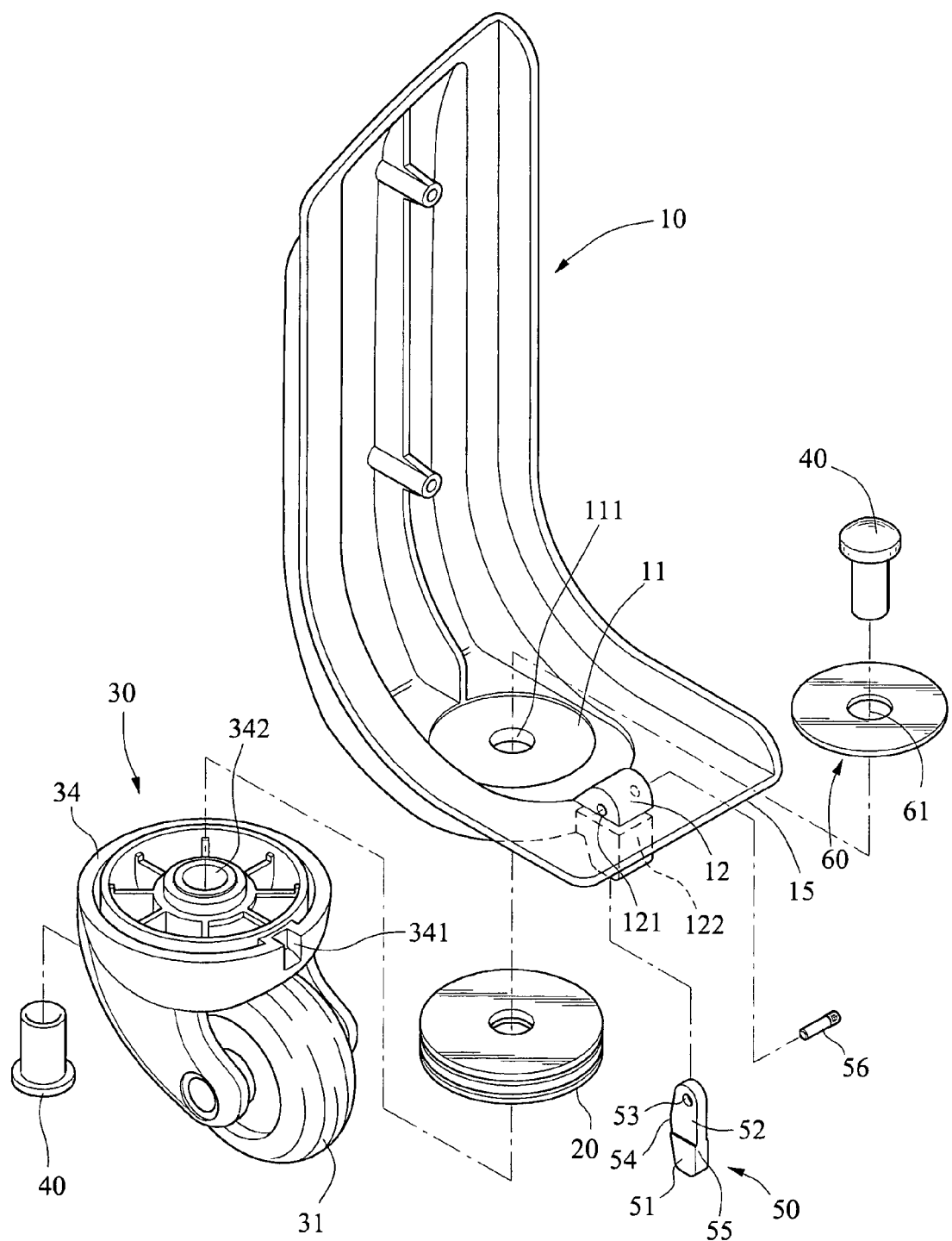
FIG. 2 is an exploded view of FIG. 1.
Figure 3:
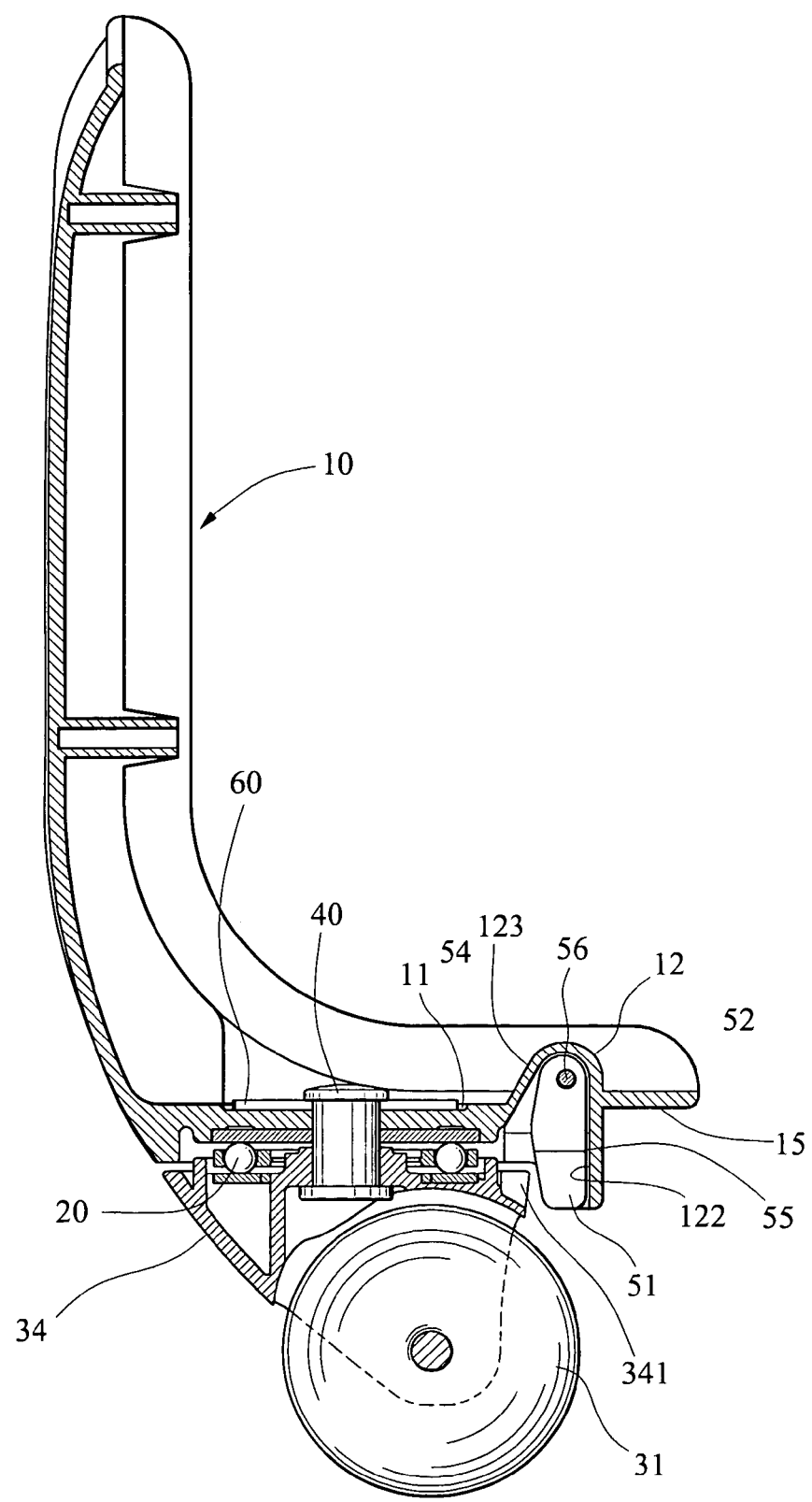
FIG. 3 is a side plan view in part section of FIG. 1 where the luggage is upright.
Figure 4:
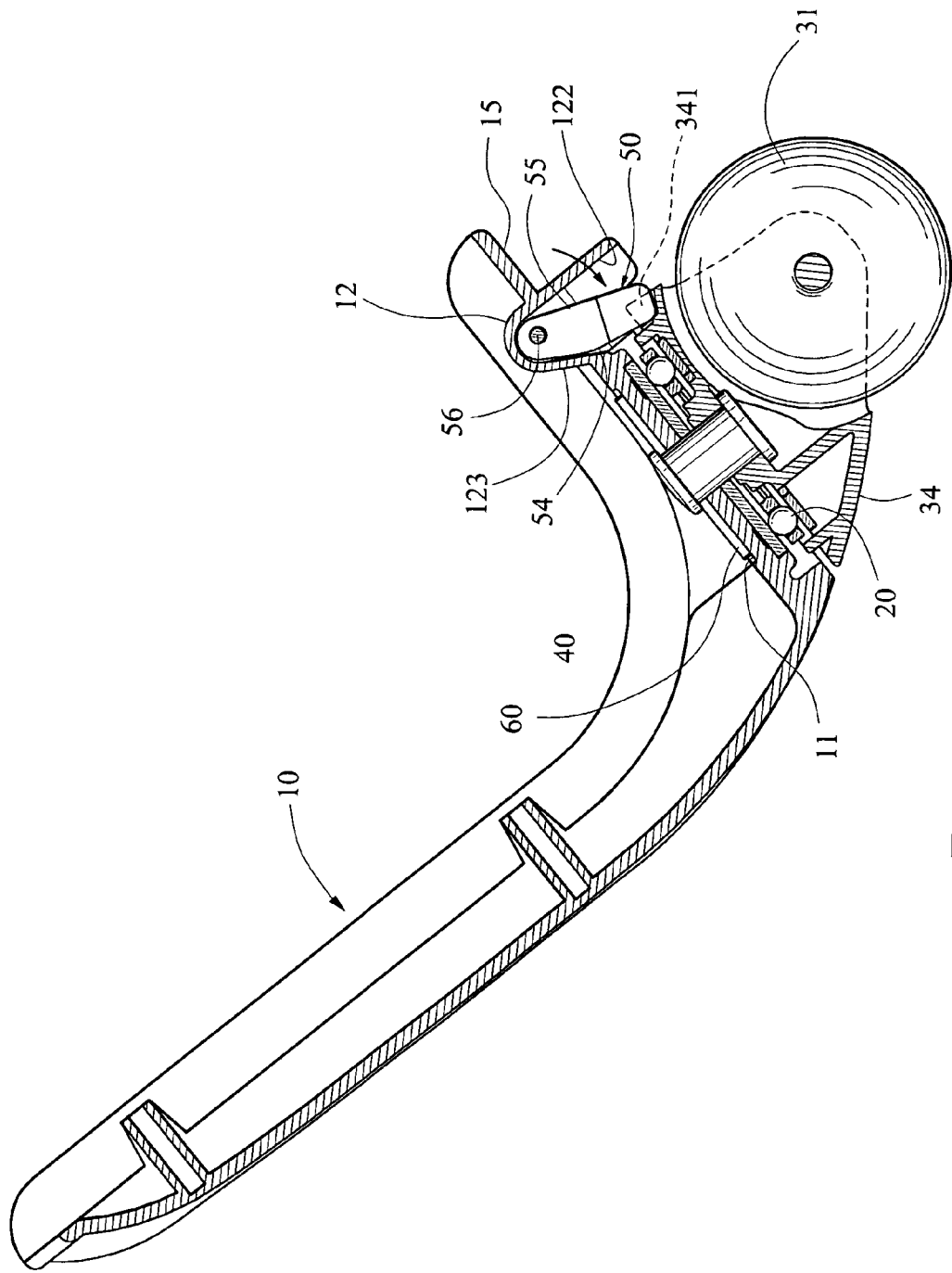
FIG. 4 is a view similar to FIG. 3 where the luggage is oblique.
Figure 5:
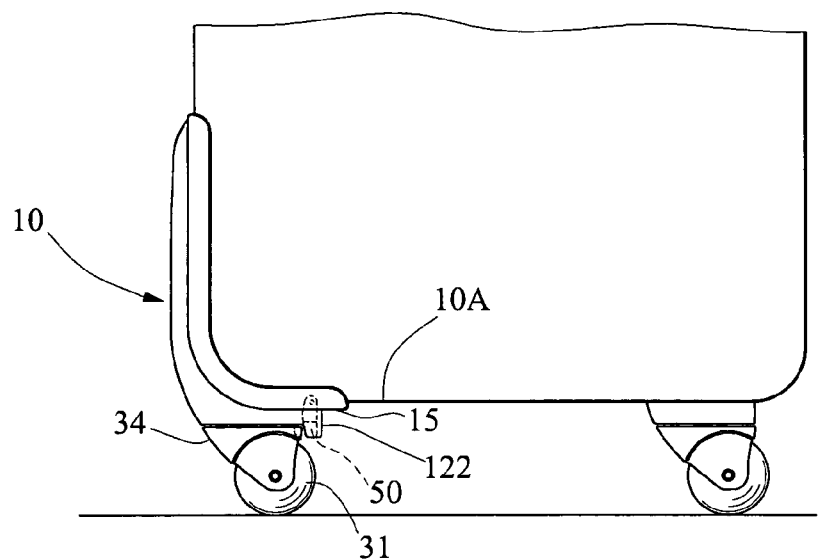
FIG. 5 is a side view showing a lower portion of an upright luggage.
Figure 6:
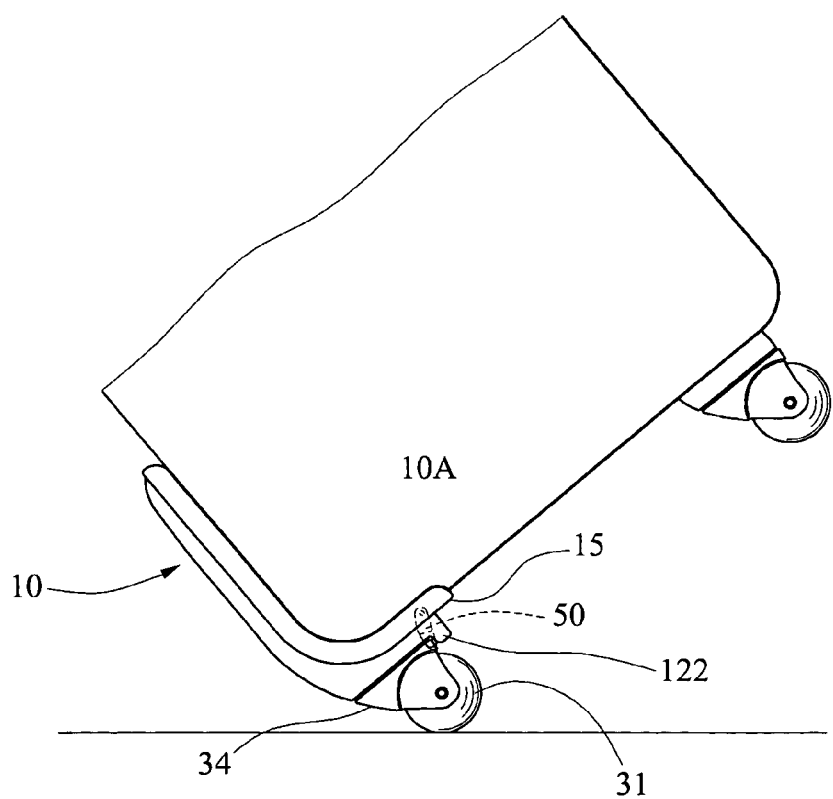
FIG. 6 is a view similar to FIG. 5 where the luggage is oblique.

The characteristics of the invention are detailed below. A positioning slot 341 is provided in the rear of an upper portion 34 of the wheel mount 30. A cavity 12 is provided in the underside 15 of the bracket 10. The cavity 12 has an upright front wall 122 and a slanted rear wall 123 so that the cavity 12 can have an n-shaped section (see FIG. 3). Such n-shaped section of the cavity 12 enables the pendulum member 50 to pivot a sufficient angle to achieve the purpose of the invention as detailed below. As shown in FIG. 2, the pendulum member 50 includes a thinner upper section 52 having a transverse hole 53 so that a pivot pin 56 can be inserted through for rotatably supporting the pendulum member 50 on a transverse aperture 121 of the cavity 12. The pendulum member 50 further includes a thicker, heavier lower section 51. The pendulum member 50 has a length about that of the front wall 122. By configuring as above, a front 55 of the pendulum member 50 is upright and proximate the front wall 122 and a rear 54 is spaced apart from the rear wall 123 due to gravity when the luggage is disposed in an upright position (see FIGS. 3 and 5). Further, the lower section 51 is disengaged from the positioning slot 341 by a predetermined distance. At this position, the caster 31 can turn horizontally. As shown in FIGS. 4 and 6, in an oblique position of luggage being wheeled, a lower portion the lower section 51 pivots about the pivot pin 56 to enter in the positioning slot 341 due to gravity. At this position, the caster 31 is limited to move toward a forward direction. As understood that the lower section 51 will pivot back to the position shown in FIG. 3 or FIG. 5 when the luggage stands upright. In view of above, a highly maneuverable luggage is carried out by the invention. Moreover, the invention is simple in construction, easy in assembly, and less trouble prone.

While the invention herein disclosed has been described by means of specific embodiments, numerous modifications and variations could be made thereto by those skilled in the art without departing from the scope and spirit of the invention set forth in the claims.

What is claimed is:

1. A caster assembly for luggage comprising:
   a) a support section connected to a bottom of the luggage and having a cavity having:
      i) an upright front wall; and
      ii) and a slanted rear wall;
   b) a wheel mount pivotally connected to a bottom of the support section and having a positioning slot and a caster;
   c) a bearing located between the support section and the wheel mount; and
   d) a pendulum member located in the cavity and being movable between engaged and disengaged positions, the pendulum member being pivotally connected to the support section at an upper section thereof, the pendulum member is spaced apart from the caster in both the engaged and disengaged positions,
   wherein, when the luggage is tilted in a predetermined direction, the pendulum member pivoting to the engaged position and a lower section thereof is inserted into the positioning slot of the wheel mount locking the wheel mount in a predetermined position, and, when the luggage is in an upright position, the pendulum member pivoting to the disengaged position and the lower section of the pendulum member separating from the positioning slot of the wheel mount allowing the wheel mount to rotate.

2. The caster assembly according to claim 1, further comprising a pivot pin, the cavity includes a transverse aperture located on an upper portion thereof, the pendulum member includes a transverse hole located in the upper section thereof, the pivot pin being inserted through the transverse aperture and the transverse hole.

3. The caster assembly according to claim 1, wherein the upper section of the pendulum member having a thickness less than a thickness of the lower section of the pendulum member.

4. The caster assembly according to claim 1, wherein the wheel mount is pivotally connected to the support section by a rivet.

5. The caster assembly according to claim 1, wherein the wheel mount includes a shaft integrally formed therewith for pivotally connecting the wheel mount to the support section.

* * * * *